United States Patent [19]
Gemmell et al.

[11] 4,419,594
[45] Dec. 6, 1983

[54] TEMPERATURE COMPENSATED REFERENCE CIRCUIT

[75] Inventors: Robert M. Gemmell, Carrollton; David B. Hildebrand, Bedford, both of Tex.

[73] Assignee: Mostek Corporation, Carrollton, Tex.

[21] Appl. No.: 319,045

[22] Filed: Nov. 6, 1981

[51] Int. Cl.[3] .................... H02J 1/04
[52] U.S. Cl. .................... 307/297; 307/491; 307/499; 307/501; 323/315
[58] Field of Search .................... 307/296 R, 297, 491, 307/494, 495, 497, 499, 501; 323/312-316; 330/257, 288, 289

[56] References Cited

U.S. PATENT DOCUMENTS

| | | | |
|---|---|---|---|
| 4,016,435 | 4/1977 | Voorman | 307/296 R |
| 4,114,053 | 9/1978 | Turrer | 307/297 X |
| 4,242,598 | 12/1980 | Johnson et al. | 307/297 X |
| 4,325,018 | 4/1982 | Schade, Jr. | 330/289 X |
| 4,359,680 | 11/1982 | Hellums et al. | 323/313 |

*Primary Examiner*—Larry N. Anagnos
*Assistant Examiner*—David R. Hudspeth

[57] ABSTRACT

A compensated current reference circuit (10) includes bipolar transistors (32, 48) which have corresponding base-to-emitter resistors (36, 52). A bipolar transistor (70) and associated circuitry produces a variable amplitude tail current which has a predetermined temperature coefficient and regulates the current flow through the bipolar transistors (32, 48). The combination of tail current for the transistor (48) and the impedance size of its corresponding resistor (52) are adjusted to produce a reference current through a transistor (44) which has a relatively large negative temperature coefficient. The bipolar transistor (32) and its associated base-to-emitter resistor (36) together with the tail current through transistor (38) are adjusted such that a current through transistor (22) is produced which has a relatively small negative temperature coefficient. The difference of these currents is produced through a transistor (18) to produce a reference current having a relatively small controlled temperature coefficient. The control voltage at node (96) is provided to a transistor (81) to produce a stable reference current therethrough. The selection of appropriate values for tail currents and the base-to-emitter resistor impedances for the bipolar transistors (32, 48) can produce any of a wide range of values of temperature compensated currents. The reference currents are also mirrored to a node (100) and summed to produce an output current having a desired temperature coefficient which is in turn passed through a resistor (116) to produce a temperature compensated voltage at a node (94).

13 Claims, 1 Drawing Figure

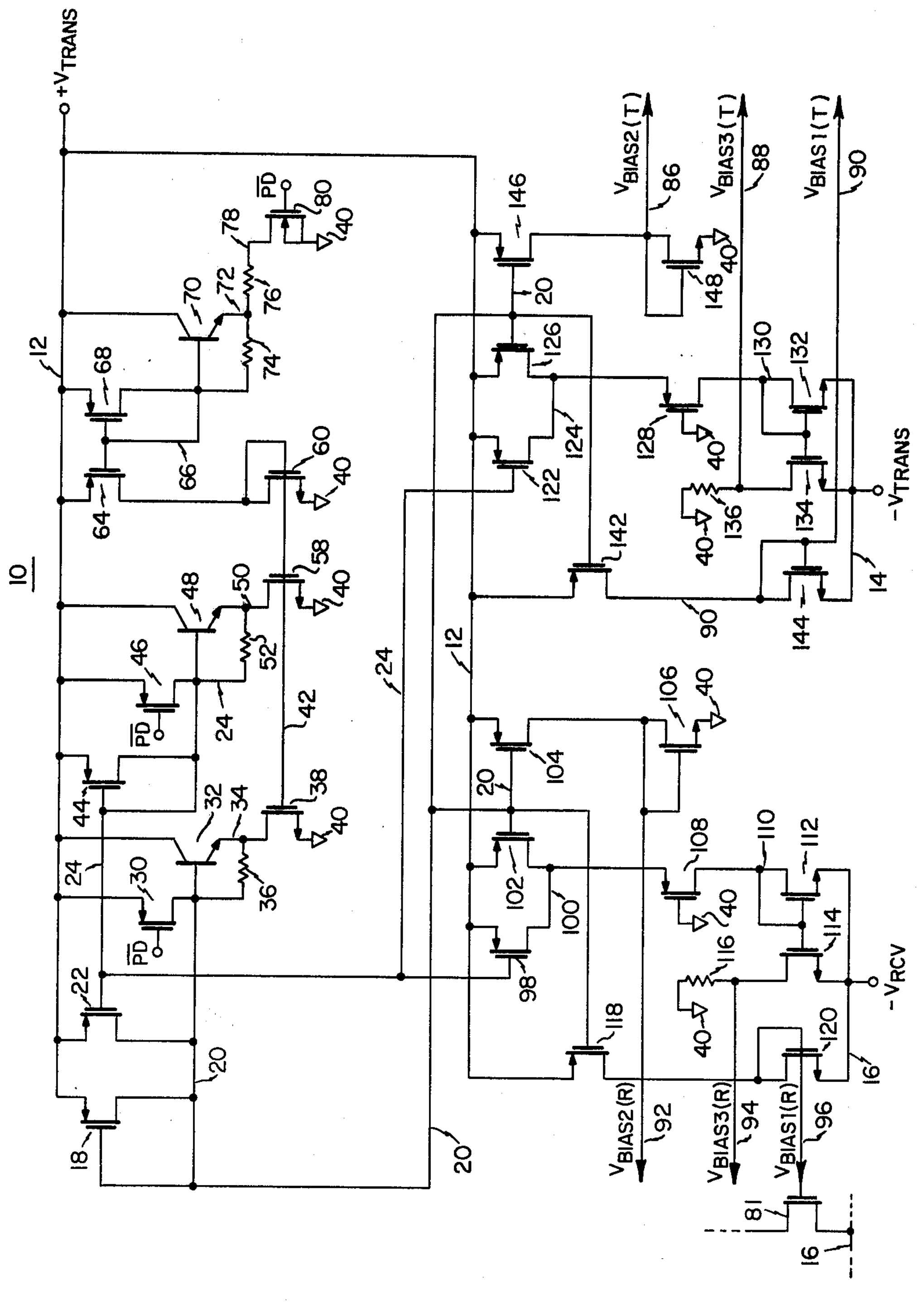
10
+VTRANS
-VTRANS
-VRCV
VBIAS2(T)
VBIAS3(T)
VBIAS1(T)
VBIAS2(R)
VBIAS3(R)
VBIAS1(R)
PD

TEMPERATURE COMPENSATED REFERENCE CIRCUIT

TECHNICAL FIELD

The present invention pertains to integrated circuits and more particularly to the generation of stable reference signals for regulating the operation of integrated circuits independent of temperature and processing variations.

BACKGROUND OF THE INVENTION

For commercial and military applications integrated circuits must be fabricated to function properly over a wide temperature range. Further the economics of manufacturing integrated circuits requires that the circuits be designed for proper operation despite parameter variations due to manufacturing operations. Analog integrated circuits in particular often require reference signals for such purposes as regulating power consumption, stabilization of operational amplifiers and biasing of selected circuit elements.

Band gap voltage reference circuits have been used to generate temperature independent voltages, however, these circuits have not been successfully applied to CMOS (complementary metal oxide semiconductor) integrated circuits for generating temperature independent currents.

In view of these problems there exists a need for a reference circuit for generating a reference current which is essentially independent of temperature and processing and can be implemented with CMOS technology.

SUMMARY OF THE INVENTION

A selected embodiment of the present invention is a circuit for generating a reference current having a controlled temperature coefficient. The circuit includes a bipolar transistor and a resistor connected between the base and emitter terminals of the bipolar transistor. Circuitry is provided for generating a first current which has a predetermined temperature coefficient. This circuitry is connected to the bipolar transistor and resistor such that the first current is essentially equal to and is drawn from the bipolar transistor and the base-to-emitter resistor. A second transistor is connected to the base terminal of said bipolar transistor and to said resistor for passing said reference current through the second transistor. The first current and the impedance of the resistor can be selected to control the temperature coefficient of the reference current which is passed through the third transistor.

BRIEF DESCRIPTION OF THE DRAWINGS

For a more complete understanding of the present invention and the advantages thereof, reference is now made to the following Description taken in conjunction with the accompanying FIGURE which is a schematic illustration of the reference circuit of the present invention.

DETAILED DESCRIPTION

Referring now to the FIGURE there is illustrated a reference circuit 10 in accordance with the present invention. The circuit 10 is preferably fabricated in CMOS technology and serves the purpose of generating a plurality of reference voltages and currents to regulate the operation of an analog circuit, not shown. The particular application of the circuit shown in the FIGURE is to operate in conjunction with an analog circuit which has both transmit and receive sections.

The circuit 10 has a number of power terminals. A power terminal 12 is connected to receive a transmit section power supply termed $+V_{TRANS}$. A transmit section has a power terminal 14 which is termed $-V_{TRANS}$. A receive section has a power terminal 16 which is labeled $-V_{RCV}$. A common ground node is also used.

A power down (PD) signal is provided to circuit 10 to virtually eliminate the power consumption of the circuit when it is in a standby mode.

The structure of circuit 10 is now described in further reference to the FIGURE. A P-channel transistor 18 has the source and drain terminals connected between power terminal 12 and a node 20 respectively. The gate and drain terminals of transistor 18 are both connected to node 20.

A P-channel transistor 22 has the source terminal connected to power terminal 12 and the drain terminal connected to node 20. The gate terminal of transistor 22 is connected to a node 24.

A P-channel transistor 30 has the source terminal connected to power terminal 12, the drain terminal connected to node 20 and the gate terminal connected to receive a power down $(\overline{PD})$ signal. The power down signal virtually eliminates the power consumption of circuit 10 as well as the circuitry driven by the circuit 10.

An NPN bipolar transistor 32 has the collector terminal connected to power terminal 12, the emitter terminal connected to a node 34 and the base terminal connected to node 20. A resistor 36 is connected between node 20 and node 34 which is between the base and emitter terminals of transistor 32.

An N-channel transistor 38 has the drain terminal connected to node 34, the source terminal connected to a common node 40 and the gate terminal connected to a node 42.

A P-channel transistor 44 has the source terminal connected to power terminal 12 and the gate and drain terminals connected to node 24.

A P-channel transistor 46 has the source terminal connected to power terminal 12, the drain terminal connected to node 24 and the gate terminal connected to receive the power down signal $\overline{PD}$.

An NPN bipolar transistor 48 has the collector terminal connected to the power terminal 12, the source terminal connected to a node 50 and the base terminal connected to node 24. A resistor 52 is connected between nodes 24 and 50.

An N-channel transistor 58 has the drain terminal connected to node 50, the source terminal connected to common node 40 and the gate terminal connected to node 42. An N-channel transistor 60 has the drain and gate terminals connected to node 42 and the source terminal connected to the common node 40.

The current through the transistor 60 is received from a P-channel transistor 64 which has the source terminal connected to the power terminal 12, the drain terminal connected to node 42 and the gate terminal connected to a node 66.

A P-channel transistor 68 is connected in a mirror configuration with transistor 64. The source terminal of transistors 68 is connected to the power terminal 12 and the gate and drain terminals of transistor 68 are connected to node 66.

An NPN bipolar transistor 70 has the collector terminal connected to the power terminal 12, the base terminal connected to node 66 and the emitter terminal connected to a node 72. A resistor 74 is connected between nodes 66 and 72. A resistor 76 is connected between node 72 and a node 78.

An N-channel transistor 80 has the drain and source terminals connected between nodes 78 and 40 respectively and the gate terminal connected to receive the power down signal $\overline{PD}$. Transistor 80 is rendered nonconductive to terminate the passage of current through transistor 70.

The voltages produced at nodes 20 and 24 are transmitted to transmit and receive sections of circuit 10. These circuits are shown respectively as the bottom right and left hand sections of FIG. 10. Circuit 10 produces six bias voltages which are supplied to operate analog circuitry, one item of which is represented by a transistor 81. The transmit section produces three bias voltages which are labeled as $V_{BIAS2(T)}$, $V_{BIAS3(T)}$ and $V_{BIAS1(T)}$. These bias voltages are generated respectively at nodes 86, 88 and 90. Corresponding receive section bias voltages are generated at nodes 92, 94 and 96. Node 96 is connected to the gate terminal of transistor 81.

The control voltage transmitted through node 24 is provided to the gate terminal of a P-channel transistor 98 which has the source terminal connected to the power terminal 12 and the drain terminal connected to a node 100. The node 20 carries a reference control voltage which is provided to the gate terminal of a P-channel transistor 102 which has the source terminal connected to the power terminal 12 and the drain terminal connected to node 100.

Node 20 is also connected to the gate terminal of a transistor 104 which has the source terminal connected to power terminal 12 and the drain terminal connected to the output node 92. The gate and drain terminals of an N-channel transistor 106 are connected to node 92 with the source terminal connected to the common node 40.

The currents transmitted through transistors 98 and 102 are provided through node 100 to the source terminal of a P-channel transistor 108. The gate terminal of transistor 108 is connected to the common node 40 and the drain terminal of the transistor 108 is connected to a node 110.

An N-channel transistor 112 receives the current passing through transistor 108 at the drain terminal thereof. The source terminal of transistor 112 is connected to the power terminal 16. The gate terminal of transistor 112 is connected to node 110. The current through transistor 112 is mirrored to an N-channel transistor 114 which has the gate terminal connected to node 110, the source terminal connected to power terminal 16 and the drain terminal connected to the output terminal 94. A resistor 116 is connected between the node 94 and the common node 40.

A P-channel transistor 118 has the source terminal connected to node 12, the gate terminal connected to node 20 and the drain terminal connected to the output node 96. An N-channel transistor 120 has the drain and gate terminals connected to node 96 and the source terminal connected to the power terminal 16.

The nodes 20 and 24 are further connected to the portion of circuit 10 which generates the transmit bias signals. Node 24 is connected to the gate terminal of a P-channel transistor 122 which has the source terminal connected to node 12 and the drain terminal connected to a node 124. The node 20 is connected to the gate terminal of a P-channel transistor 126 which has the source terminal connected to the power terminal 12 and the drain terminal connected to the node 124. The currents through transistors 122 and 126 are combined at the node 124 and transmitted to the source terminal of a P-channel transistor 128. The drain terminal of transistor 128 is connected to a node 130 and the gate terminal is connected to the common node 40.

The node 130 is connected to the gate terminals of a set of N-channel mirror transistors 132 and 134. Transistor 132 has the drain terminal connected to node 130 and the source terminal connected to the power terminal 14. Transistor 134 has the drain terminal connected to the output node 88 and the source terminal also connected to the power terminal 14. A resistor 136 is connected between node 88 and the common node 40.

A P-channel transistor 142 has the source terminal connected to a power terminal 12, the gate terminal connected to node 20 and the drain connected to the output node 90. An N-channel transistor 144 has the drain and gate terminals connected to the output node 90 and the source terminal connected to the power terminal 14.

A P-channel transistor 146 has the gate terminal connected to the node 20, the source terminal connected to node 12 and the drain terminal connected to the output node 86. An N-channel transistor 148 has the gate and drain terminals connected to the output node 86 and the source terminal connected to the common node 40.

Operation of the circuit 10 is now described in reference to the FIGURE. The circuit 10 is preferably fabricated using standard CMOS processing which includes diffused resistors that have an inherent large positive temperature coefficient. The bipolar transistors in circuit 10 are selected to have sufficiently large beta parameters such that the base currents can be ignored. The primary objective of the circuit 10 is to develop a constant current through an application circuit represented by transistor 81 where the current is essentially indpendent of temperature and process variations. The process variations occur in the manufacture of the integrated circuit which contains circuit 10. Once a constant current, which serves as a reference, is developed through any one of a number of transistors such as 120 this current can be mirrored to other circuit elements to produce the desired reference control.

A reference current is developed through resistor 74 due to the base-to-emitter voltage of transistor 70. The current through resistor 74, however, does have a negative temperature coefficient.

The transistors 64 and 68 are connected in a mirror configuration such that the current through these transistors are related by a constant. If the transistors are the same size, the currents are essentially equal, however, the sizes of the transistors can be ratioed to produce corresponding ratios of current. Thus, the current through transistor 64 is proportional to the current through resistor 74. This current is passed through transistor 60 and is mirrored to transistors 38 and 58. Therefore, the currents through transistors 38 and 58 are proportional to the current through the base-to-emitter resistor 74.

A current is developed through resistor 52 due to the base-to-emitter voltage of transistor 48. The current through resistor 52 is drawn from transistor 44 which mirrors this current through the transistor 22. Thus, the current through transistor 22 is proportional to the current through resistor 52.

The bipolar transistor 32 has the base-to-emitter resistor 36 through which is developed a current due to the base-to-emitter voltage of transistor 32. The current through resistor 36 is received essentially from node 20. Therefore, the sum current flowing through transistors 22 and 18 is essentially equal to the current through resistoı 36. The current through transistor 18 is proportional to the current through resistor 36 minus the current through resistor 52. This difference current passes through transistor 18 thereby producing a reference current through transistor 18 where the reference current has an adjustable and controlled temperature coefficient. A zero temperature coefficient may be selected to provide a temperature compensated current. This current can be mirrored to other related circuitry by means of nodes 86, 90, 92 and 96.

The current through transistor 18 is mirrored into transistor 102 and likewise the current through transistor 22 is mirrored to transistor 98. The currents through transistors 98 and 102 are combined at node 100 and passed through transistors 108 and 112. The combined currents at node 100 have a relatively large negative temperature coefficient which is approximately equal in magnitude but opposite in sign to the temperature coefficient of the resistors in circuit 10. This results in a temperature compensated voltage available to other related circuitry by means of nodes 88 and 94. The sizes of transistors 18,22,98 and 102 are selected to provide current ratios to achieve this result.

The current through transistor 112 is mirrored through transistor 114 and passed through resistor 116. The temperature coefficient of the current through resistor 116 is equal in magnitude but opposite in sign to the temperature coefficient of resistor 116 thus producing at node 94 a reference bias voltage that is substantially temperature insensitive. The bias voltage produced at node 96 is provided to external circuitry represented by transistor 81 wherein the current through the transistor 120 is mirrored into the transistor 81. Thus, the circuit 10 produces a constant reference current which can be mirrored into any selected transistor in the driven circuitry.

Node 20 is further connected to mirror current through transistor 104 and transistor 118. The current through transistor 104 is passed through transistor 106 to produce a bias voltage at node 92. This bias voltage is slightly greater than one transistor threshold voltage above the voltage of the common node 40. The current through transistor 118 is further passed through transistor 120 to produce a bias voltage at node 96. These bias voltages are used to mirror reference currents in application circuits, not shown.

Control of the temperature coefficient of the base-to-emitter voltage of transistor 48 is achieved by controlling the currents through the collector terminal of transistor 48 and through the impedance value selected for resistor 52. This is done by selecting an appropriate value for the resistor 52 and by controlling the tail current of the transistor 48 through the operation of transistor 58. The current through transistor 58 is essentially determined by operation of the transistor 70 and its associated circuitry. The temperature coefficient of the current produced by the $V_{BE}/R$ current reference associated with transistor 48 is negative but controllable by varying the tail current through transistor 58 and selecting the impedance of resistor 52. Similarly the temperature coefficient of the current by the $V_{BE}/R$ current reference associated with transistor 22 is negative but controllable by varying the tail current through transistor 38 and the impedance of resistor 36. Therefore the current in transistor 18 which is based on the difference between the currents through resistors 36 and 52 has a temperature coefficient controllable over a wide range of positive or negative values or zero. Thus the reference voltages at nodes 86, 90, 92 and 96 can also be adjusted to produce mirror currents which have a desired temperature coefficient.

The circuit 10 is also relatively insensitive to variations due to manufacturing process operations since the performance of the circuit is determined largely by the ratios of resistor values and transistor emitter areas which with careful layout vary little with fluctuations in the manufacturing operation.

In summary, the present invention comprises a circuit in which parameters can be easily selected to produce a reference current that has a required temperature coefficient and is relatively insensitive to processing variations. This current can then be mirrored into application circuitry to provide a stable reference. Also another current can be produced with a selected temperature coefficient and passed through a resistor with an opposite coefficient such that the resulting voltage has essentially a zero temperature coefficient.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

We claim:

1. A circuit for generating a reference current having a controlled temperature coefficient, comprising:
- a bipolar transistor having a collector for coupling to a power supply,
- a resistor connected between the base and emitter terminals of said bipolar transistor,
- means for generating a first current having a predetermined temperature coefficient, said means for generating connected to said bipolar transistor and said resistor such that said first current is essentially equal to the sum of the collector current of said bipolar transistor and the current through said resistor, and
- transistor means connected to the base terminal of said bipolar transistor and said resistor for passing said reference current through said transistor means.

2. A circuit for generating a reference current having a controlled temperature coefficient, comprising:
- a first bipolar transistor having a collector connected to a first power terminal,
- a resistor connected between the base and emitter terminals of said bipolar transistor,
- a second transistor connected between the emitter terminal of said first transistor and a second power terminal,
- means connected to the control terminal of said second transistor for producing a first current therethrough, said first current having a predetermined temperature coefficient, and a third transistor connected between said first power terminal and the base terminal of said first transistor wherein said reference current is transmitted through said third transistor.

3. A circuit for generating a reference current having a controlled temperature coefficient, comprising:

a first bipolar transistor having the collector terminal thereof connected to a first power terminal, a first resistor coupled between the emitter terminal of said first transistor and a second power terminal, a second resistor connected between the base and emitter terminals of said first transistor, a second transistor having the source and drain terminals thereof connected between said first power terminal and the base terminal of said first field effect transistor, a third field effect transistor having the source and drain terminals thereof connected between a first node and said second power terminal, means connected to the gate terminals of said second and said third transistors for mirroring the current through said second transistor in said third transistor, a fourth bipolar transistor having the collector terminal thereof connected to said first power terminal and the emitter terminal thereof connected to said first node, a third resistor connected between the base and emitter terminals of said fourth transistor, a fifth bipolar transistor having the drain and source terminals thereof connected between said first power terminal and the base terminal of said fourth transistor and having the gate terminal thereof connected to the base terminal of said fourth transistor wherein said reference current is passed through said fifth transistor.

4. A circuit for generating a reference current having a controlled temperature coefficient, comprising:

means for generating a first current having a predetermined temperature coefficient, a first bipolar transistor, a first resistor connected to the base and emitter terminals of said first bipolar transistor, a first current mirror transistor connected to mirror said first current therethrough and sink both the emitter current from said first bipolar transistor and the current through said first resistor, first transistor means connected to the base terminal of said first bipolar transistor for passing a second current therethrough, a second bipolar transistor having a collector for coupling to said power supply, a second resistor connected to the base and emitter terminals of said second bipolar transistor, a second current mirror transistor connected to mirror said first current therethrough and sink both the emitter current from said second bipolar transistor and the current through said second resistor, second transistor means connected to the base terminal of said second bipolar transistor for passing a third current therethrough, and means connected to said first and second transistor means for producing a difference current between said second and third currents, said difference current having a selected temperature coefficient and corresponding to said reference current.

5. The circuit recited in claim 4 wherein said means for producing a difference current comprises a field effect transistor having the source terminal thereof connected to a first power terminal for coupling to said power supply and the gate and drain terminals thereof connected to the base terminal of said second bipolar transistor.

6. The circuit recited in claim 4 including:

a third current mirror transistor connected to mirror said difference current therethrough, a fourth current mirror transistor connected to mirror said second current therethrough, and means for combining the currents passing through said third and said fourth current mirror transistors to produce a summation current having a selected temperature coefficient.

7. The circuit recited in claim 6 including:

means for producing a mirror current of said summation current, and a third resistor connected to receive said mirrored summation current and produce a reference voltage therefrom.

8. The circuit recited in claim 7 wherein said mirrored summation current and said third resistor have temperature coefficients which are essentially equal in magnitude and opposite in sign whereby said reference voltage is substantially temperature insensitive.

9. The circuit recited in claim 4 including:

a third current mirror transistor connected to mirror said second current, and a third transistor connected to serially receive said mirrored second current and produce therefrom a reference current.

10. A method for generating a reference current having a controlled temperature coefficient, comprising the steps of:

generating a first current having a predetermined temperature coefficient, drawing a second current, which is proportional to said first current, from a combination of the emitter terminal of a bipolar transistor and a resistor connected between the base and emitter terminals of said bipolar transistor, and passing said reference current through a circuit element connected between a power node and the junction of said resistor and the base terminal of said bipolar transistor.

11. A method for generating a reference current having a controlled temperature coefficient, comprising the steps of:

generating a first current having a predetermined temperature coefficient, current mirroring said first current to first and second current mirror transistors to produce respective first and second mirror currents, sinking said first mirror current from a combination of emitter current from a first bipolar transistor and current from a first resistor connected between the base and emitter terminals of said first bipolar transistor, passing a second current through a transistor connected between a power terminal and the junction of said first resistor and the base terminal of said first bipolar transistor, sinking said second mirror current from a combination of emitter current from a second bipolar transistor and current from a resistor connected between the base and emitter terminals of said second bipolar transistor, passing a third current through a transistor connected between said power terminal and the junction of said second resistor and the base terminal of said second bipolar transistor, and combining said second and third currents to produce said reference current.

12. The method recited in claim 11 including the steps of:

current mirroring said second current and said reference current to produce a mirrored second current and a mirrored reference current, adding said mirrored reference current and said mirrored second current to produce a summation current, current mirroring said summation current to produce a mirrored summation current, and passing said mirrored summation current through a third resistor to produce a reference voltage.

13. The method recited in claim 11 including the steps of:

current mirroring said third current to produce a mirrored third current, and passing said mirrored third current through a transistor to produce a reference current.

* * * * *